United States Patent
Gleeson et al.

(10) Patent No.: US 9,016,937 B2
(45) Date of Patent: Apr. 28, 2015

(54) SENSOR

(75) Inventors: Helen Frances Gleeson, Manchester (GB); Ingo Dierking, Manchester (GB); Sarabjot Kaur, Manchester (GB); Bruce Donaldson Grieve, Manchester (GB); Neville Christopher Paul Woodyatt, Manchester (GB); Paul Douglas Brimicombe, Manchester (GB)

(73) Assignee: Syngenta Limited, Surrey (GB)

( * ) Notice: Subject to any disclaimer, the term of this patent is extended or adjusted under 35 U.S.C. 154(b) by 534 days.

(21) Appl. No.: 13/203,422

(22) PCT Filed: Feb. 8, 2010

(86) PCT No.: PCT/EP2010/051460
§ 371 (c)(1),
(2), (4) Date: Aug. 25, 2011

(87) PCT Pub. No.: WO2010/097279
PCT Pub. Date: Sep. 2, 2010

(65) Prior Publication Data
US 2011/0310926 A1    Dec. 22, 2011

(30) Foreign Application Priority Data

Feb. 27, 2009 (GB) .................................. 0903383.8

(51) Int. Cl.
*G01K 7/32* (2006.01)
*G01K 7/00* (2006.01)
*G01K 7/34* (2006.01)

(52) U.S. Cl.
CPC *G01K 7/343* (2013.01); *G01K 7/00* (2013.01); *Y10S 252/962* (2013.01)

(58) Field of Classification Search
USPC ............. 374/178, 45, 56, 141, 208, 130, 131, 374/132, 160, 161, 162, 117, 118, 119, 16, 374/100, 163, 170, 177, 183, 184, 101, 186, 374/185; 252/408.1; 349/182, 183, 184, 349/186, 188, 203, 167, 185, 168, 169, 72, 349/130, 139, 20
See application file for complete search history.

(56) References Cited

U.S. PATENT DOCUMENTS 3,974,317 A * 8/1976 Sharpless ........................ 428/215
4,072,055 A * 2/1978 Elliott ............................. 374/160

(Continued)

FOREIGN PATENT DOCUMENTS

GB    1506256    4/1978
GB    1549584    8/1979

(Continued)

OTHER PUBLICATIONS

Kaur, S. et al: "Behaviour of Goldstone and Soft Mode at Tc in Ferroelectric Liquid Crystals", Physica B, vol. 344, 2004, pp. 133-139.

(Continued)

*Primary Examiner* — Gail Kaplan Verbitsky
(74) *Attorney, Agent, or Firm* — R. Kody Jones (57) ABSTRACT

An electrical temperature sensor (10) comprises a liquid crystalline material (12). First and second electrically conductive contacts (14), (16), having a spaced relationship therebetween, contact the liquid crystalline material (12). An electric property measuring device is electrically connected to the first and second contacts (14), (16) and is arranged to measure an electric property of the liquid crystalline material (12). The liquid crystalline material (12) has a transition temperature T at which it undergoes a phase change between polar and non-polar phases. The phase change between polar and non-polar phases causes a change in said electric property of the liquid crystalline material (12).

18 Claims, 6 Drawing Sheets

(56) References Cited

U.S. PATENT DOCUMENTS

| | | | | |
|---|---|---|---|---|
| 4,077,260 A | * | 3/1978 | Gray et al. | 116/217 |
| 4,257,911 A | * | 3/1981 | Gray et al. | 252/299.65 |
| 4,279,152 A | * | 7/1981 | Crossland | 374/162 |
| 4,299,727 A | * | 11/1981 | Hof et al. | 252/408.1 |
| 4,310,837 A | * | 1/1982 | Kornrumpf et al. | 340/598 |
| 4,385,844 A | * | 5/1983 | Fergason | 374/160 |
| RE31,715 E | * | 10/1984 | Coates et al. | 349/168 |
| 4,506,550 A | * | 3/1985 | Sandhu | 73/603 |
| 4,723,018 A | * | 2/1988 | Shionozaki et al. | 546/342 |
| 5,130,828 A | * | 7/1992 | Fergason | 349/199 |
| 5,352,381 A | * | 10/1994 | McDonnell et al. | 252/299.6 |
| 5,781,266 A | * | 7/1998 | Nakao et al. | 349/172 |
| 5,918,981 A | * | 7/1999 | Ribi | 374/162 |
| 5,973,762 A | * | 10/1999 | Vorfloussev | 349/133 |
| 6,057,821 A | * | 5/2000 | Hughes et al. | 345/97 |
| 6,067,130 A | * | 5/2000 | Okabe et al. | 349/37 |
| 6,601,563 B2 | | 8/2003 | Funke et al. | 123/321 |
| 6,812,914 B1 | * | 11/2004 | Takahashi | 345/97 |
| 7,527,747 B2 | * | 5/2009 | Helgee et al. | 252/299.01 |
| 8,396,690 B2 | * | 3/2013 | Konuma et al. | 702/183 |
| 2002/0121625 A1 | * | 9/2002 | Green | 252/299.01 |
| 2007/0103414 A1 | * | 5/2007 | Aota et al. | 345/87 |
| 2009/0119047 A1 | * | 5/2009 | Zelin et al. | 702/82 |
| 2010/0177027 A1 | * | 7/2010 | Ikeda | 345/92 |
| 2011/0096254 A1 | * | 4/2011 | Ikeda | 349/33 |
| 2013/0002990 A1 | * | 1/2013 | Kosuge et al. | 349/72 |
| 2013/0114642 A1 | * | 5/2013 | Gleeson et al. | 374/186 |

FOREIGN PATENT DOCUMENTS

| | | | |
|---|---|---|---|
| GB | 2136632 | | 9/1984 |
| JP | 355087013 A | * | 7/1980 |
| JP | 56166413 A | * | 12/1981 |
| JP | 59051325 A | * | 3/1984 |
| JP | 61132830 A | * | 6/1986 |
| JP | 2005316013 A | * | 11/2005 |
| WO | WO 2008017316 A1 | * | 2/2008 |

OTHER PUBLICATIONS

Furukawa, T. et al: "Nonlinear dielectric investigation of ferroelectric liquid crystals", Electrets, 1991 (ISE 7), Proceedings, 7th International Symposium on IEEE (Cat. No. 91CH3129-6), Berlin, Germany, Sep. 25, 1991, pp. 421-426.

Marcos, C. et al: "Tunable feedback resonator based on a nematic liquid crystal cell as variable capacitance" SPIE, PO Box 10, Bellingham, WA, 2007.

Johri, G.K. et al: "On the study of dielectric properties on liquid crystals" Dielectric Liquids, 1999 (ICDL '99), Proceedings of the 1999 IEEE 13th International Conference on Nara, Japan Jul. 20-25, 1999, Piscataway, NJ, pp. 669-674.

* cited by examiner

| Material | R | A | B | C |
|---|---|---|---|---|
| AS661 | R1 | H | H | F |

Figure 3

| Material | R | A | B | C |
|---|---|---|---|---|
| AS620 | R2 | H | H | H |

SENSOR

This application is a 371 of International Application No. PCT/EP2010/051460 filed Feb. 8, 2010, which claims priority to GB 0903383.8 filed Feb. 27, 2009, the contents of which are incorporated herein by reference.

The present invention relates to a temperature sensor and to a method of temperature sensing.

Temperature sensors have many diverse applications in common use. It is known to use liquid crystals as part of temperature sensors which can be read optically. One such example are 'digital' strip thermometers which are commonly available. The use of liquid crystals as a temperature sensor, for example a thermometer, may be advantageous in that it is cheaper to manufacture than other types, such as mercury based ones. Most applications utilising liquid crystals require that the liquid crystals are aligned in order that they function as desired.

Optical liquid crystal thermometers would be complex and relatively costly to integrate within an electronic system. One reason for this is that it would be necessary to provide both a light source and optical sensor means to detect any change in the state of the liquid crystal in response to the temperature. The optical sensor would thence produce an output which can form part of an electrical system.

It is an object of the present invention to overcome or mitigate at least one of the above disadvantages.

According to a first aspect of the invention there is provided an electrical temperature sensor comprising a liquid crystalline material; first and second electrically conductive contacts, having a spaced relationship therebetween, which contact the liquid crystalline material; and an electric property measuring device, electrically connected to the first and second contacts and arranged to measure an electric property of the liquid crystalline material; wherein the liquid crystalline material has a transition temperature T at which it undergoes a phase change between polar and non-polar states, the phase change between polar and non-polar states causing a change in said electric property of the liquid crystalline material.

Hence, the apparatus can be used as a cheap temperature sensor with an output which can easily be integrated in to an electrical system.

Preferably, the polar state is a ferroelectric phase and the non-polar state is a non-ferroelectric phase. Alternatively, the polar state may be a ferrielectric phase and the non-polar state may be a non-ferrielectric phase. Alternatively, the polar state may be either a ferroelectric or ferrielectric phase, and the non-polar state may be an anti-ferro electric phase.

Desirably, said change in an electric property is a step change. A step change in the electrical property results in it being more straightforward to tell what state the liquid crystalline material is in depending on the measured electrical property.

Desirably, said electric property is one of impedance, inductance, resistance, conductance or capacitance.

Advantageously, liquid crystals within the liquid crystalline material are aligned.

Preferably, the first and second contacts are parallel plates, the liquid crystalline material being received therebetween.

Desirably, the ferroelectric phase is the chiral Smectic C phase.

Desirably, the non-ferroelectric phase is one of Smectic A, Nematic, isotropic or anti-ferroelectric phases. An example of an anti-ferroelectric phase is the anti-ferroelectric Smectic phase.

Preferably, said change in said electric property of the liquid crystalline material is measured via said first and second contacts by an electrical signal which is supplied across said first and second contacts.

Desirably, said electrical signal comprises at least one pulse.

Advantageously, said electrical signal is periodic.

Preferably, said electrical signal oscillates.

Advantageously, the oscillation has a frequency of less than 15 kHz. In some embodiments the oscillation frequency of the electrical signal may be less than 10 kHz.

Desirably, the oscillation has a frequency of less than 1 kHz and said measurable change in an electric property is a change in capacitance.

Alternatively, the oscillation has a frequency greater than 1 kHz and said measurable change in an electric property is a change in conductance.

Preferably, T has a value of less than 150° C.

Desirably, the electrical temperature sensor comprises a plurality of temperature sensor cells, each according to a temperature sensor discussed above, wherein the transition temperature T of the liquid crystalline material in at least two of the temperature sensor cells is different.

Advantageously, the transition temperature T of the liquid crystalline material in each temperature sensor cell is chosen such that they form an equally spaced series over a desired range.

According to a second aspect of the invention, there is provided a method of temperature sensing using a liquid crystalline material having a transition temperature T at which it undergoes a phase change between polar and non-polar states, the phase change between polar and non-polar states causing a change of an electric property of the liquid crystalline material; the method comprising measuring said electric property of a liquid crystalline material; and determining whether the temperature is greater or less than T based on a comparison between the measured electric property and a threshold.

The electric property may be a first electric property measured by a periodic electric signal of a first frequency supplied across said first and second contact, the method additionally comprising measuring a second electric property of the liquid crystalline material, via the first and second contacts, using a periodic electric signal of a second frequency.

The electric property may be measured by a periodic electric signal that includes two or more components having different frequencies, the method additionally comprising resolving the response of the liquid crystalline material to the two or more components having different frequencies, a first electric property of the liquid crystalline material being measured by the response of the liquid crystalline material to one of the components of the electric signal and a second electric property of the liquid crystalline material being measured by the response of the liquid crystalline material to another component of the electric signal.

The first measured electric property and the second measured electric property may be the same electric property measured at different frequencies.

The first measured electric property and the second measured electric property may be different electric properties.

Two or more electric properties may each be measured at two or more different frequencies.

The first measured electric property may be capacitance and the second measured electric property may be conductance; the capacitance being measured using a frequency which is less than the frequency used to measure the conductance.

The method may additionally comprise comparing said first measured electric property and said second measured electric property so as to determine a corrected output of the sensor.

Preferably, the method additionally comprises measuring said electric property of the liquid crystalline material in each cell via the first and second contacts; and determining a range within which the temperature lies as defined by measured electric property of the liquid crystalline material in two temperature sensor cells with consecutive transition temperatures T.

In some embodiments of the above aspects of the present invention, the polar state is a ferroelectric phase and the non-polar state is a non-ferroelectric phase. However, in other embodiments of the invention it may be advantageous that the polar state is a ferrielectric phase and the non-polar state is a non-ferrielectric phase.

Other preferred and advantageous features of the various aspects of the present invention will be apparent from the following description.

Specific embodiments of the present invention will now be described, by way of example only, with reference to the accompany drawings, in which.

Figure 1:
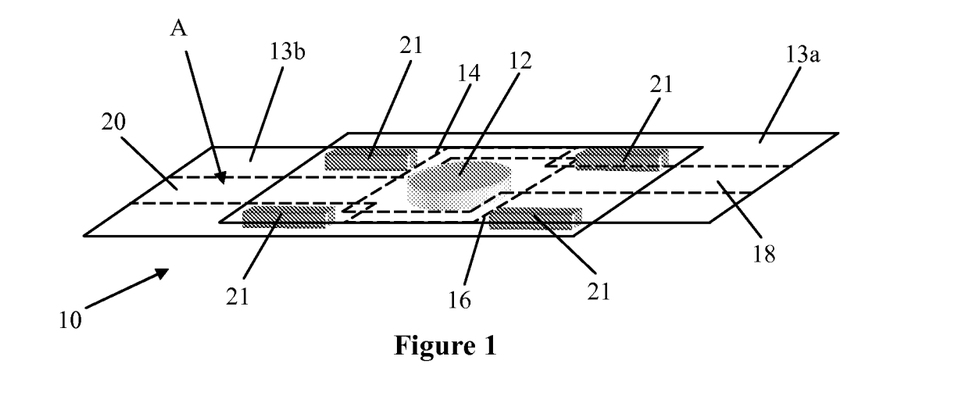
FIG. 1 is a perspective view of a temperature sensor in accordance with an embodiment of the present invention, a portion being transparent to aid clarity.

Referring to FIG. 1, a temperature sensor 10 comprises a quantity of liquid crystalline material 12 sandwiched between a first substrate 13a and second substrate 13b. Each substrate 13a, 13b has an electrical contact plate, 14 and 16 respectively, which contact the liquid crystalline material. Attached to each plate 14, 16 is an electrical conduction member 18, 20 which enables electrical connection of the temperature sensor 10 to any electronic circuit of which the sensor may form part. As shown in FIG. 1, the contact plate 14, 16 and conduction member 18, 20 (both shown in dashed lines) may be unitary in nature. In this embodiment, the substrates 13a, 13b are glass slides with a conductive ITO (indium tin oxide) coating which forms the contact plates and conduction members. It will be appreciated that in some embodiments no substrate will be required and that the contact plates and conduction members may be made of any suitable electrically conductive material.

In order to maintain a constant separation between the substrates 13a, 13b, and thereby try to maintain a constant thickness of the liquid crystalline material, spacers 21 are used. In the described embodiment the spacers are of a Kapton® material of a thickness of approximately 5 to 10 µm. In other embodiments the spacers may be made from other materials, and may have other suitable thicknesses.

An example of a sensor configuration which has been shown to work is the use of parallel contact plates 14, 16 with a surface area of 25 mm$^2$ and separation of 5 µm.

The sensor 10 is fabricated by fixing the substrates 13a, 13b together with the intermediate spacers 21 in position. The fixing may occur by the use of a suitable glue applied along the elongate edges of the substrate 13a, 13b or by any other suitable fixing method. The contact plates 14, 16 are such that they are offset from the longitudinal centre of the substrates 13a, 13b, as shown clearly in FIG. 1. The substrates 13a, 13b are fixed together such that the contact plates 14, 16 face each other and are aligned along the normal to the substrate surfaces. Alignment of the contact plates 14, 16 in this manner results in a portion of each substrate which overlaps with the other substrate and a portion of each substrate which does not. One such portion of the substrate 13b, which does not overlap, is indicated by A.

In order to locate the liquid crystalline material 12 in between the contact plates 14, 16, a drop of the liquid crystalline material 12 is placed on portion A of the substrate 13b such that it is adjacent the gap between the substrates 13a, 13b. The liquid crystal is then drawn between the substrates 13a, 13b by capillary action. It is preferable to fill the sensor 10 with liquid crystalline material 12 whilst the liquid crystalline material is in either the chiral Nematic (N*) or Isotropic (Iso.) phase. The liquid crystalline material may be KC FLC 10, which is commercially available from Kingston Chemicals, Hull, UK. Using KC FLC 10 the sensor is filled at approximately 100° C.

In some embodiments of the present invention, the liquid crystalline material may be dispersed within a polymer. For example, the liquid crystalline material may be microencapsulated. This would enable the liquid crystal to be printed directly onto a substrate.

Once the liquid crystalline material 12 has been inserted into the sensor 10, the sensor may be sealed with an appropriate sealant such that the liquid crystalline material 12 is isolated from the atmosphere. This prevents any contamination of the liquid crystalline material 12, which could lead to the sensor 10 giving inaccurate results.

The liquid crystalline material, at a particular temperature, exists in either a polar state or a non-polar state. Examples of materials which exist in a polar state include ferroelectric and ferrielectric materials. Ferroelectric and ferrielectric materials possess a spontaneous electric polarisation that can be reversed by the application of an external electric field. In a ferroelectric phase, the dipoles within the liquid crystalline material are aligned, whereas, in a ferrielectric phase, adjacent parts of the dipole structure, for instance layers, may be either aligned in the same or opposite direction. This results in ferrielectric liquid crystalline materials having a net polarisation at a macroscopic level which has a magnitude that is less than an equivalent ferroelectric phase. It should be noted that it is possible for a single liquid crystalline material to have both ferroelectric and ferrielectric phases depending on its temperature.

Ferroelectric and ferrielectric materials may undergo a phase change between a polar state and a non-polar state as a result of a change of temperature. The non-polar state may be a non-ferroelectric phase or a non-ferrielectric phase.

Examples of non-ferroelectric phases include Smectic A, Nematic, isotropic, and anti-ferroelectric. The anti-ferroelectric phase (for example the anti-ferroelectric chiral Smectic C (SmC*$_A$) phase) is considered to be a non-polar state in a thin film geometry (which may be used by embodiments of the invention). This is because, although individual layers of the liquid crystal are polarised, the thin film geometry means there will be many alternating adjacent layers within the liquid crystalline material which result in no net polarisation. In a similar manner, certain phases (for example the ferroelectric, chiral Smectic C (SmC*) phase) may be considered to be a polar state in a thin film geometry. This is because, although at a macroscopic level the net polarisation of the liquid crystalline material may be considered to be zero due to the helical change in polarisation between layers, the thin film geometry means that the number of layers within the liquid crystalline material is less than the number of layers required for a complete helix cycle.

A liquid crystalline material may be referred to as having a thin film geometry if it has a thickness of for example between about 1 and 50 μm. The temperature sensor 10 may have liquid crystalline material 12 which has a thin film geometry.

Figure 3:
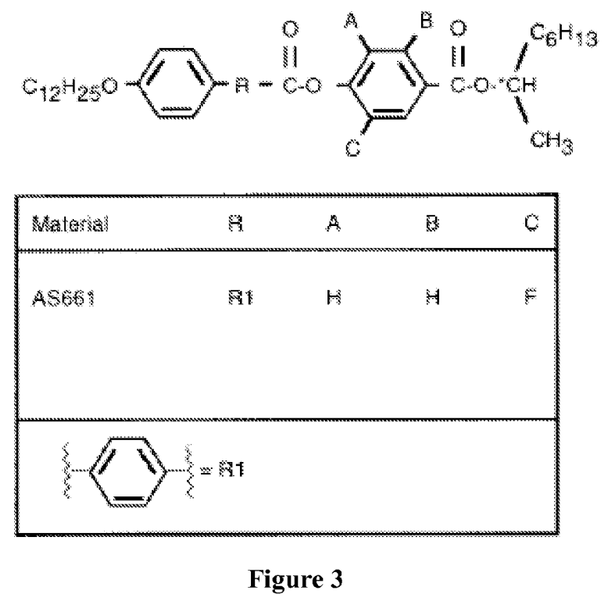
FIG. 3 is a graphical representation of the chemical structure of a liquid crystalline material AS 661.

Examples of liquid crystalline materials which may be used in the temperature sensor, and which have a phase change between a ferroelectric phase and a non-ferroelectric phase, include KC FLC 10 and AS 661, both of which are commercially available from Kingston Chemicals as stated above, and Felix M4851/050 which is commercially available from Clariant, Hoechst, Germany. The chemical structure of AS 661 is shown in FIG. 3.

Figure 4:
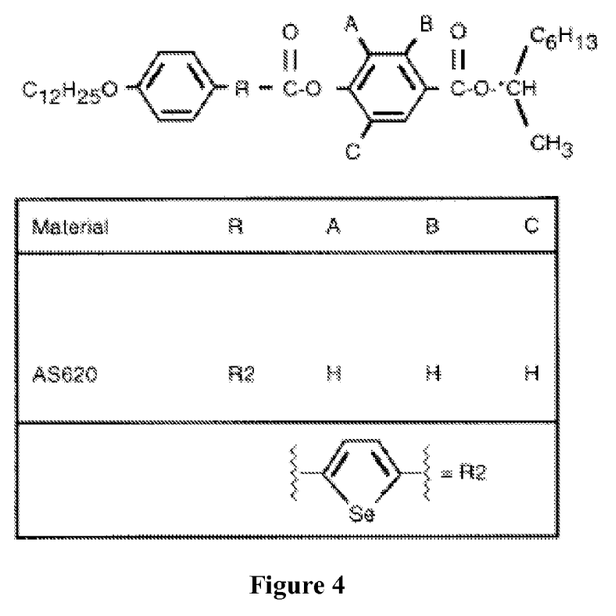
FIG. 4 is a graphical representation of the chemical structure of a liquid crystalline material AS 620.

Examples of liquid crystalline materials which may be used, and have a phase change between a ferrielectric phase and a non-ferrielectric phase, include AIS 179 and AS 620. These may also be obtained from Kingston Chemicals. The structure of AS 620 is shown in FIG. 4.

In use, the sensor 10 is connected via the conduction members 18, 20 to an electrical property measuring device (not shown), such as a dielectric bridge. The electrical property measuring device is used to measure at least one electrical property of the liquid crystalline material. Examples of electric properties which may be measured include impedance, inductance, resistance, conductance and capacitance. Any appropriate electrical property of the liquid crystalline material may be measured. The geometry of the sensor may depend on the electrical property of the liquid crystalline material being measured. For example, in order to measure the inductance of the liquid crystalline material, the sensor would necessarily be significantly larger than that used for measuring capacitance or conductance.

As the temperature of the sensor changes, the state of the liquid crystalline material may change. As such, a change in temperature of the liquid crystal which spans a phase transition temperature causes the liquid crystalline material to switch between a first state and a second state. The temperature at which a phase change happens is also governed by the ambient pressure. The ingress of contaminants, including gases, liquids and solids, into the liquid crystalline material may also affect the phase transition temperature. The phase change of interest is that between polar and non-polar states, for example between ferroelectric and non-ferroelectric phases or between ferrielectric and non-ferrielectric phases. This phase change occurs at a phase transition temperature, T.

The phase transition series of the above mentioned liquid crystalline materials at atmospheric pressure are given below:

KC FLC 10: Sm C*63° C. Sm A 98° C. N 108° C. Iso.

Felix M4851/050: Cryst. −20° C. Sm C*64.4° C. Sm A 68.9° C. N 73.9° C. Iso.

AIS 179: Cryst. 33° C. Sm C$_A$*61° C. Sm C$_{F11}$*66° C. Sm C$_{F12}$* 71° C. Sm C* 77° C. Sm A 89° C. Iso.

AS 620: Cryst. 67.7° C. Sm C$_A$*97.8° C. Sm C$_\gamma$*99.0° C. Sm C*109.4° C. Sm A 116.6° C. Iso.

AS 661: Cryst. 53.3° C. Sm C$_A$*78.3° C. Sm C$_\gamma$*82.0° C. Sm C*90.7° C. Sm A 105.7° C. Iso.

The most common ferroelectric liquid crystal phase is the chiral Smectic C (Sm C*) phase, in which the liquid crystal molecules exist in layers. Each molecule is angled relative to the layer normal at a fixed tilt angle. Successive layers show a gradual change in the direction of tilt (although the tilt angle remains constant), such that the molecule precesses about the layer normal from layer to layer, on the surface of a hypothetical cone. Other known liquid crystal phases which exhibit ferroelectric properties include chiral Smectic I (Sm I*) and chiral Smectic F (Sm F*).

A known ferrielectric liquid crystal phase is Smectic C*$_{F11}$, which is also known as the intermediate three-layer phase.

The phase change between polar and non-polar states (e.g. ferroelectric and non-ferroelectric phases or ferrielectric and non-ferrielectric phases) causes a change in electric properties (including capacitance and conductance) of the liquid crystalline material which is significantly larger than that for the phase change between any other states. This can be seen in tables 1 and 2.

TABLE 1

| Substance | Phase 1 | Phase 2 | Transition temperature | Frequency | Capacitance in Phase 1 | Capacitance in Phase 2 | Change in Capacitance |
|---|---|---|---|---|---|---|---|
| MLC-6204-000 | Nematic | Isotropic | 63° C. | 20 Hz | 14.5 nF | 15.5 nF | ~1 nF |
| SCE 13 | Nematic | Isotropic | 100.8° C. | 5 kHz | 542 pF | 528 pF | ~10 pF |
| TM-1001 | Nematic* | Isotropic | 44° C. | 1 kHz | 631 pF | 629 pF | ~1 pF |
| AS-620 | Smectic A | Isotropic | 116.6° C. | 5 kHz | 690 pF | 640 pF | ~50 pF |
| SCE 13 | Smectic C* | Smectic A | 60.8° C. | 100 Hz | 7 nF | 800 pF | ~6 nF |
| AS-661 | Smectic C* | Smectic A | 90.7° C. | 100 Hz | 8 nF | 1 nF | ~7 nF |
| AS-620 | Smectic C* | Smectic A | 109.4° C. | 100 Hz | 9 nF | 1 nF | ~8 nF |
| SCE 13 | Smectic A | Nematic | 86.3° C. | 1 kHz | 545 pF | 535 pF | ~10 pF |

Table 1 shows that the change in capacitance between ferroelectric (chiral Smectic C (Sm C*)) and non-ferroelectric (Smectic A (Sm A)) phases is approximately an order of magnitude, compared to much smaller changes in capacitance for phase transitions between non-ferroelectric phases (Nematic (N), isotropic (Iso.), Smectic A (Sm A) and chiral Nematic (N*)). It should also be noted that the relative size of the capacitance change compared to the values of the capacitance in phases 1 and 2 is much larger for phase transitions between ferroelectric and non-ferroelectric phases than for any other phase transition. The results in table 1 were all taken using parallel contact plates 14, 16 with a surface area of 25 mm² and separation of approximately 5 μm, and homogeneous liquid crystal alignment.

TABLE 2

| Substance | Phase 1 | Phase 2 | Transition temperature | Frequency | Conductance in Phase 1 | Conductance in Phase 2 | Change in Conductance |
|---|---|---|---|---|---|---|---|
| MLC-6204-000 | Nematic | Isotropic | 63° C. | 1 kHz | 6 μS | 10 μS | ~1 μS |
| SCE 13 | Nematic | Isotropic | 100.8° C. | 100 Hz | 300 nS | 400 nS | ~100 nS |
| KC FLC10 | Nematic | Isotropic | 108° C. | 100 HZ | 100 nS | 200 nS | ~100 nS |
| TM-1001 | Nematic* | Isotropic | 44° C. | 20 Hz | 15 nS | 25 nS | ~10 nS |
| AS-620 | Smectic A | Isotropic | 116.6° C. | 100 Hz | 40 nS | 80 nS | ~40 nS |
| SCE 13 | Smectic C* | Smectic A | 60.8° C. | 1 kHz | 10 μS | 100 nS | ~10 μS |
| AS-620 | Smectic C* | Smectic A | 109.4° C. | 1 kHz | 10 μS | 100 nS | ~10 μS |
| KC FLC10 | Smectic C* | Smectic A | 63° C. | 1 kHz | 10 μS | 30 nS | ~10 μS |
| SCE 13 | Smectic A | Nematic | 86.3° C. | 100 Hz | 150 nS | 175 nS | ~25 nS |

Similarly, table 2 shows that the change in conductance between ferroelectric and non-ferroelectric phases can be approximately one or two orders of magnitude, depending on the frequency of the signal which is used to measure the change. This is significantly larger than changes in conductance for phase transitions between non-ferroelectric phases. It should also be noted that the relative size of the conductance change compared to the values of the conductance in phases 1 and 2 is much larger for phase transitions between ferroelectric and non-ferroelectric phases than for any other phase transition. The results in table 2 were all taken using parallel contact plates 14, 16 with a surface area of 25 mm² and separation of approximately 5 μm, and homogeneous liquid crystal alignment.

Table 1 and table 2 also show results taken as the liquid crystalline material changes between a ferroelectric phase and a non-ferroelectric phase, using liquid crystalline materials SCE 13 and AS 661. It is possible to use these materials (in addition to those already mentioned), which are commercially available as before, within the present invention.

The effect on the measured electric property of the liquid crystalline material due to a change between a ferrielectric phase and a non-ferrielectric phase will be less than that of a similar sensor which contains a liquid crystalline material which undergoes a phase change between a ferroelectric phase and a non-ferroelectric phase. However, the change in the electric property of the liquid crystalline material due to a phase change involving the ferrielectric state will still be measurable, and as such liquid crystalline materials with a ferrielectric phase can also be used to work the invention.

The quantitative values of the measurements of capacitance and conductance will be affected by not only the temperature and the frequency of measurement, but also by the geometry of the sensor, for example the area of the contact plates and the thickness of liquid crystalline material between them. However, the qualitative relationship of the conductance and capacitance of the polar and non-polar phases will remain the same.

To make the measurements of capacitance change and conductance change as shown in tables 1 and 2 respectively, an oscillating AC electric signal having a magnitude of about 50 mV was supplied to the liquid crystalline material 12 via the conduction members 18, 20. The frequency of the electric signal used is indicated in the fifth column of the table.

Although an oscillating AC electric signal was used, it would also be possible to use any suitable periodic signal, for example pulses or an offset DC oscillating signal. A single pulse may also be used. This single pulse may be modulated by an appropriate frequency or may be unmodulated.

The capacitance and conductance of the liquid crystalline material 12 may be measured by a dielectric bridge which is connected across the liquid crystalline material 12 via conduction members 18, 20. In this case the dielectric bridge is a Wayne Kerr (Chichester, UK) precision component analyzer 6430A, which is commercially available. However, it will be appreciated that any suitable device for measuring a change in the capacitance or conductance may be used. For experimentation purposes, the temperature of the sensor 10 may be controlled by any appropriate temperature controller, such as a Linkam (Tadworth, UK) TMS 93 temperature controller with THMS 600 hot stage, which is commercially available.

In order to measure the capacitance or conductance change, a measurement is taken with the liquid crystalline material in each phase either side of the phase transition in question. This is done by taking a first measurement at a temperature below the phase transition temperature (the phase transition temperature is shown in the fourth column of each table), when the liquid crystal is in a first phase; and a second measurement at a temperature above the phase transition temperature, when the liquid crystal is in a second phase.

Since the capacitance and conductance of the liquid crystalline material 12 undergo a significant change when there is a phase change between polar and non-polar states (e.g. between ferroelectric and non-ferroelectric phases or between ferrielectric and non-ferrielectric phases), it is possible to detect what phase the liquid crystalline material 12 is in by measuring its capacitance and/or conductance. Due to the fact that the electrical property (e.g. capacitance or conductance) is dependant on the phase of the liquid crystalline material, it is possible to choose a threshold of the electrical property such that above the threshold the liquid crystalline material is in one phase and below the threshold the liquid crystalline material is in the other phase. The threshold may be a threshold value. In this way it is possible to determine, as a result of knowing what phase the liquid crystalline material is in, whether the temperature is above or below the phase transition temperature. As such, it is possible to select or engineer a liquid crystal with a ferroelectric to non-ferroelectric (or ferrielectric to non-ferrielectric) phase transition temperature as desired, such that the sensor 10 can be used to determine whether the temperature is above or below a desired temperature. In this manner, the temperature sensor 10 can be likened in certain embodiments to a temperature switch which switches between polar and non-polar states as the result of a temperature change.

Figure 5:
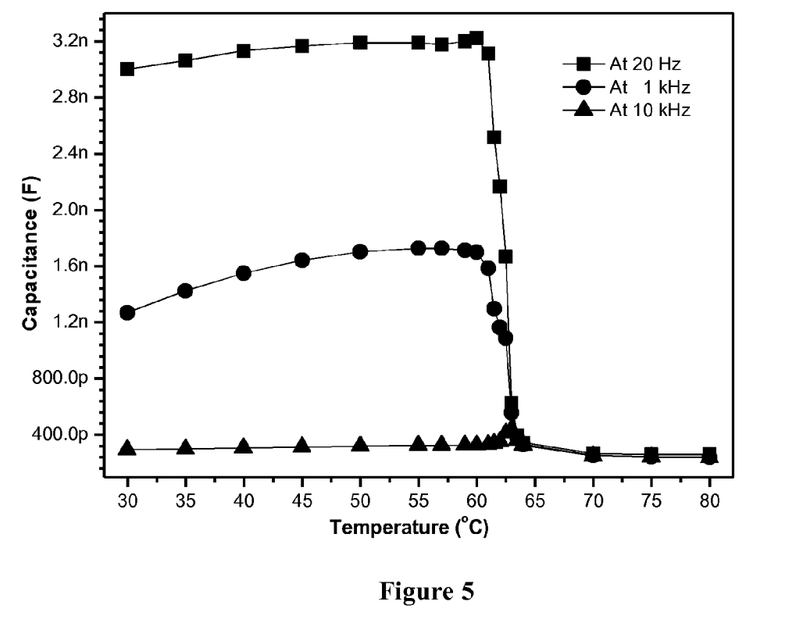
FIG. 5 is a graph showing the capacitance of a liquid crystalline material KC FLC 10 as a function of temperature at 3 different frequencies.

FIG. 5 shows a graph of capacitance against temperature for KC FLC10. Measurements have been taken with electric signals of three different frequencies. The ferroelectric to non-ferroelectric (Sm C* to Sm A) phase transition temperature is 63° C. The graph shows that at 20 Hz and at 1 kHz, the capacitance of the liquid crystalline material 12 undergoes a significant change as it undergoes a phase change between the ferroelectric and the non-ferroelectric phase. This change may be described as a step change. A step change is defined by a transition point, which in this case is the transition temperature, 63° C. At temperatures below the transition point the capacitance is fairly constant with a relatively high value. At temperatures above the transition point the capacitance is fairly constant with a relatively low value. Around the transition point (i.e. between approximately 62° C. and 64° C.) there is a relatively abrupt change between the relatively high value below the transition point, and the relatively low value above the transition point. This abrupt change is the step change.

The graph also shows that at a frequency of 10 kHz, unlike at 20 Hz or 1 kHz, there is very little change in the capacitance either side of the transition point. The effect of the frequency of the measuring electric signal on the obtained measurements will be discussed in detail below.

Figure 6:
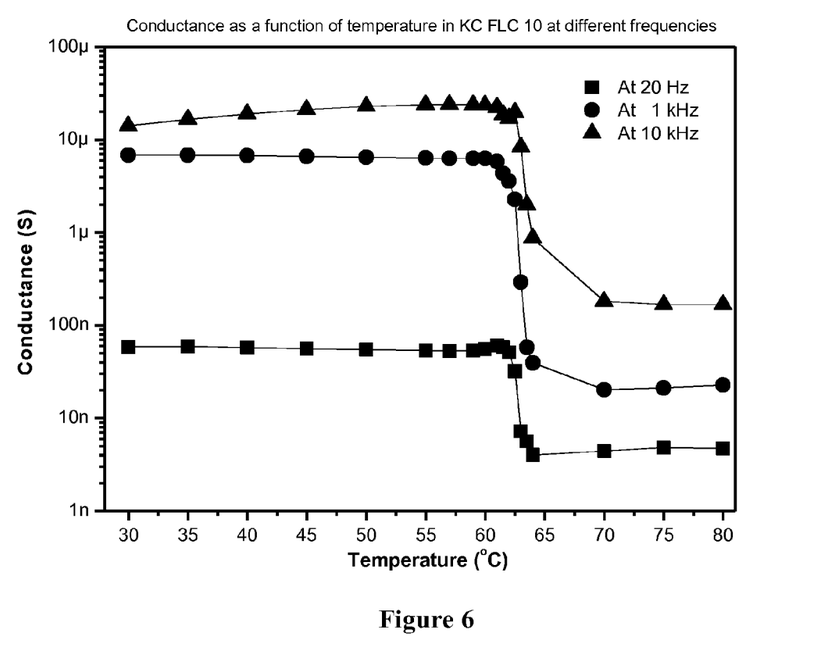
FIG. 6 is a graph showing the conductance of KC FLC 10 as a function of temperature at 3 different frequencies.

FIG. 6 shows a graph of conductance (on a logarithmic scale) against temperature for KC FLC10. Again, measurements have been taken with electric signals of three different frequencies. The graph shows, at all three frequencies 20 Hz, 1 kHz and 10 kHz, that the conductance of the liquid crystalline material 12 also undergoes a step change as it undergoes a phase change between a ferroelectric and a non-ferroelectric phase. At all frequencies the conductance of the liquid crystalline material 12 is fairly constant at temperatures below the transition point (transition temperature, 63° C.) and has relatively high value, which is frequency dependant. The conductance of the liquid crystalline material 12 is also fairly constant at temperatures above the transition point and has a relatively low value compared to that for the same frequency below the transition point. The base of the step to the right of each graph is less pronounced, especially at 10 kHz, however, this effect is exaggerated due to the fact that a logarithmic scale has been employed. Again, the effect of the frequency of the measuring electric signal on the obtained measurements will be discussed in detail below.

Figure 7:
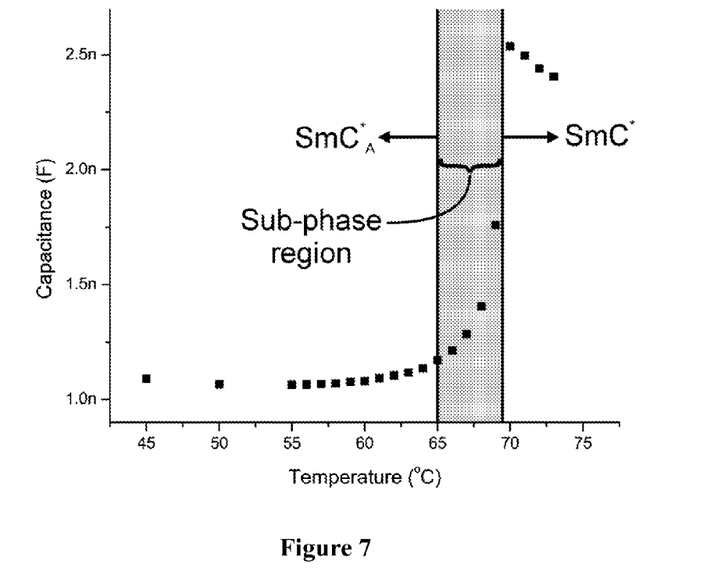
FIG. 7 is a graph showing the capacitance of AIS179 mixed with 3% by weight of chiral dopant R1011 as a function of temperature.

FIG. 7 shows a graph of capacitance against temperature for liquid crystalline material AIS179 mixed with 3% by weight of chiral dopant R1011. The capacitance measurements shown in the graph were taken at a frequency of 200 Hz. As the temperature of the liquid crystalline material increases, the phase of the liquid crystalline material changes from an anti-ferroelectric (SmC*$_A$) phase to a ferroelectric SmC* phase (i.e. from a non-polar state to a polar state). A significant change of the capacitance of the liquid crystalline material takes place when the phase changes. In addition, a number of sub-phases are present between the SmC*$_A$ and SmC* phases in the liquid crystalline material. This gives a smoother variation of capacitance with applied voltage than is seen for example in FIGS. 5 and 6. In some instances, the smoother variation of capacitance with temperature may decrease the accuracy with which a change of temperature may be determined. Materials other than AIS179 mixed with 3% by weight of chiral dopant R1011 may have a direct transition between an anti-ferroelectric phase and a ferroelectric phase. This will provide a more sudden change in capacitance at the transition temperature, thereby increasing the accuracy with which a change of temperature may be determined.

Although a change in the measured electrical property will occur with any state change between polar and non-polar states, the magnitude of the change will be dependant, among other things (for example the sensor geometry), on the liquid crystalline material used. In addition, the magnitude of the change in the measured electric property will depend on the nature of the phase transition of the liquid crystalline material. For example, the magnitude of the change in measured electric property may be less for a transition between ferrielectric and non-ferrielectric states compared to a transition between ferroelectric and non-ferroelectric states using the same material or one which is substantially similar. The magnitude of the change in the measured electric property may also depend on what the non-ferrielectric or non-ferroelectric phase involved in the phase transition concerned is. For example, using AIS 179, the change in the measured electric property as the liquid crystalline material undergoes a phase transition between the ferrielectric Sm $C_{F11}$* phase and the non-ferrielectric Sm $C_{F12}$* may be less than the change in measured electric property as the liquid crystalline material undergoes a phase transition between ferrielectric Sm $C_{F11}$* phase and a non-ferrielectric phase which is one of the Sm A, Nematic or Isotropic phase. In AIS 179, for example, there is no direct phase transition between the ferrielectric Sm $C_{F11}$* phase and the non-ferrielectric Sm A, Isotropic or Nematic phases, however there may be other materials in which this is possible.

Figure 2:
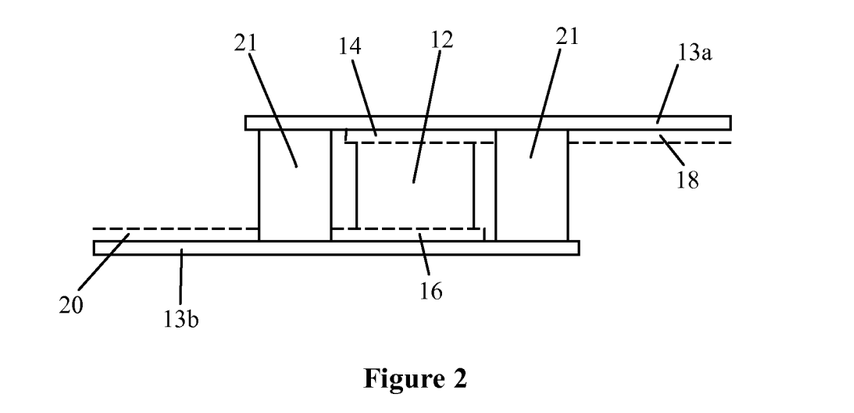
FIG. 2 is a side elevation of the temperature sensor shown in FIG. 1.

Unlike in the majority of liquid crystal applications, such as display applications, it is not necessary that the liquid crystalline material 12 be aligned uniformly in relation to the substrates 13a, 13b (see FIGS. 1 and 2). Some degree of alignment may be required, but this alignment need not be uniform. A significant proportion of the liquid crystalline material 12 should be aligned such that its long axis is not parallel to the direction of the electric field applied by the contact plates 14, 16. In this context the term 'significant proportion' is intended to mean a proportion which is sufficiently large that an electric property of the liquid crystalline material may be seen to change when the liquid crystalline material changes from a polar to a non-polar state. A significant proportion of the liquid crystalline material 12 may be aligned such that the average molecular long axis lies in a plane which is perpendicular to the electric field. The orientation of the molecular long axis within this plane may be non-uniform.

Not aligning the liquid crystalline material 12 uniformly in relation to the substrates 13a, 13b provides the advantage that the temperature sensor 10 is easier and cheaper to construct, and avoids having to heat the temperature sensor to a high temperature and then cooling it slowly to promote uniform alignment. A further advantage is that liquid crystalline material may be used which is not capable of being aligned uniformly.

If liquid crystalline material is aligned uniformly, with the average molecular long axis in a plane which is perpendicular to the electric field, then response of the sensor 10 will be greater. To this end, at least one of the substrates 13a, 13b may be provided with an alignment layer, such as a rubbed polymer layer (alignment layers are known in the art).

Figure 8:
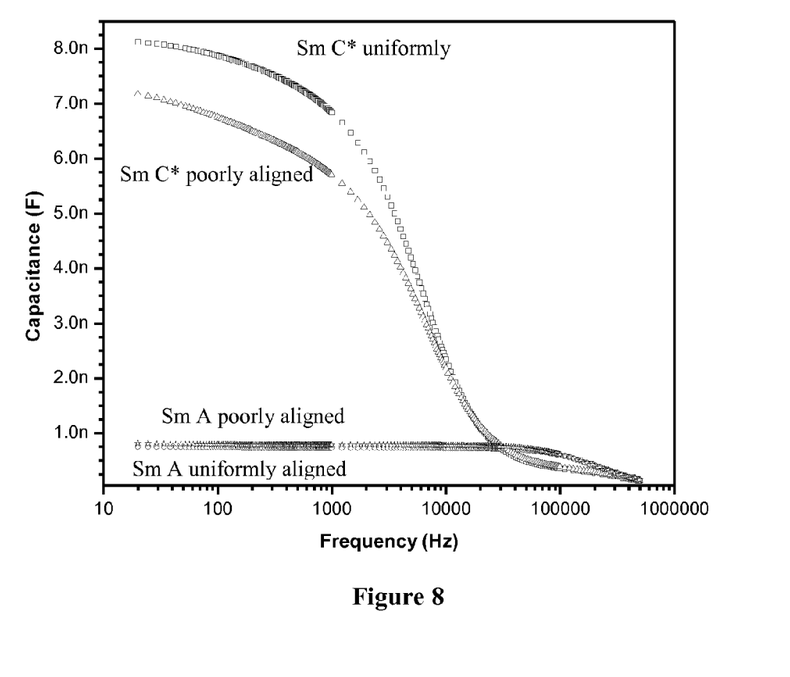
FIG. 8 is a graph showing the capacitance change of a liquid crystalline material AS 661 as a function of frequency for both a sample in which the liquid crystalline material is aligned and a sample in which it is not.

FIG. 8 shows a graph of capacitance for a liquid crystalline material, AS 661, as a function of frequency. The phase transition temperature between ferroelectric and non-ferroelectric phases for AS 661 is approximately 91° C. Measurements were taken either side of the transition temperature at 100° C. and 90° C. The measurements were taken for a sample in which the liquid crystalline material was uniformly aligned, and for a sample in which the liquid crystalline material was poorly aligned. It is evident from FIG. 8 that the change in capacitance due to the phase change is greater for the uniformly aligned sample than for the poorly aligned sample. However, the difference in capacitance change between the uniformly aligned and poorly aligned samples is only approximately 10%. The difference in capacitance change between the uniformly aligned and poorly aligned samples would be greater if the alignment of the poorly aligned sample were to be degraded still further. However, a capacitance change would still be seen. Thus, the quality of the alignment of the liquid crystalline material 12 does not affect the operating principles of the sensor 10, but may affect the size of the capacitance change seen by the sensor.

It should be noted that if the liquid crystalline material 12 is aligned uniformly with the molecular long axis parallel to the applied electric field, then little or no change in capacitance will be observed across the polar to non-polar phase transition. This is because in this orientation the spontaneous polarization of the polar phase is perpendicular to the electric field, and hence there is no coupling between the polarization and the electric field.

Figure 9:
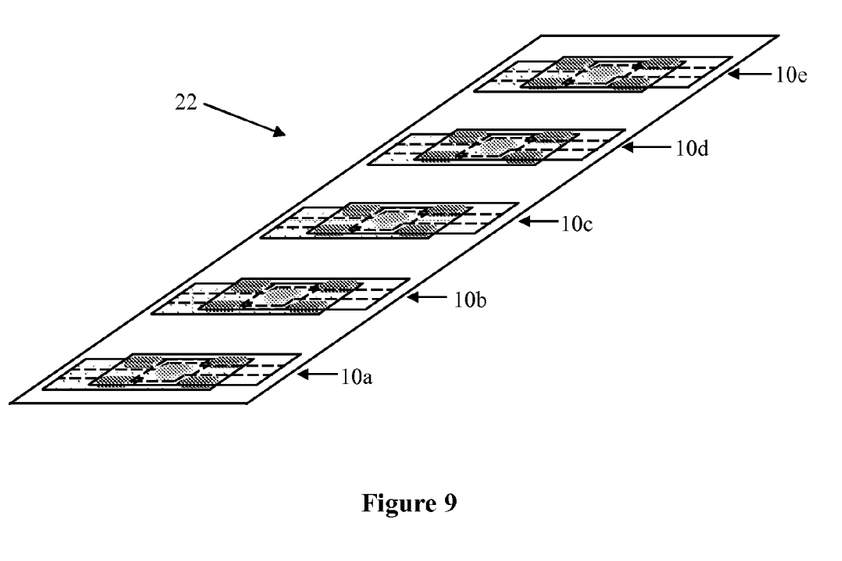
FIG. 9 is a perspective view of a temperature sensor in accordance with a further aspect of the invention.

In a second embodiment of the proposed invention, as shown in FIG. 9, a series of temperature sensors 10a, 10b, 10c, 10d, 10e, similar to those already described, are provided in a single sensor assembly 22. The operation of each sensor, or sensor cell, 10a, 10b, 10c, 10d, 10e in the series is identical to that already discussed, and as such further detail of their operation is omitted.

The phase transition temperature between polar and non-polar states (including ferroelectric and non-ferroelectric or ferrielectric and non-ferrielectric phases) for each sensor 10a, 10b, 10c, 10d, 10e within the sensor assembly is chosen such that there are at least two different phase transition temperatures. In one embodiment, the phase transition temperature of each sensor 10a, 10b, 10c, 10d, 10e is different. By measuring an electrical property (e.g. capacitance and/or conductance) of each sensor 10a, 10b, 10c, 10d, 10e within the sensor assembly 22 it is possible to determine whether the temperature is above or below the phase transition temperature of each sensor 10a, 10b, 10c, 10d, 10e. If the phase transition temperature is known for each sensor 10, then by measuring the conductance and/or capacitance, and hence the phase, of sensors 10, 10b, 10c, 10d, 10e with adjacent phase transition temperatures, it is possible to determine a range within which the temperature lies.

For example, the sensor assembly 22 may be constructed using a series of five sensors 10a, 10b, 10c, 10d, 10e with ferroelectric to non-ferroelectric transition temperatures of 0° C., 5° C., 10° C., 15° C. and 20° C. respectively. If the capacitance and/or conductance measurements show that sensors 10a and 10b are in a non-ferroelectric phase and sensors 10c, 10d and 10e are in a ferroelectric phase, then the temperature is in the range of 5° C. to 10° C.

The range and resolution of a temperature sensor assembly 22 of this type depends on the number of sensors 10 of which it is comprised and the selection of liquid crystalline material 12, and therefore phase transition temperature, of each sensor 10. The closer adjacent phase transition temperatures of each sensor 10 are, the greater the resolution of the sensor assembly 22.

The relative arrangement of the sensors 10 as part of the sensor assembly 22 may take any desired form. For example, sensors 10 may be arranged randomly; arranged such that sensors with adjacent phase transition temperatures are adjacent one another; arranged such that they form a particular shape; or arranged in three dimensions. Any other suitable relative sensor arrangement may be used.

It has been found that the magnitude of the change in conductance and/or capacitance which occurs as a result of a phase transition between polar and non-polar states (e.g. ferroelectric and non-ferroelectric or ferrielectric and non-ferrielectric phases) is dependant upon the frequency of the electric signal used to measure the change. This is shown clearly in FIGS. 9 and 10, which show the change in capacitance and conductance respectively, as a function of the electric signal frequency, as a sample of KC FLC 10 changes phase between a ferroelectric phase and a non-ferroelectric phase. In order to obtain the data shown in FIGS. 9 and 10, the difference between the capacitance or conductance of the liquid crystal in each state was measured. Given the phase transition temperature for KC FLC 10 is 63° C., one measurement was taken at 60° C. whilst the liquid crystalline material was in the ferroelectric phase; and the other was taken at 64° C. whilst the liquid crystalline material was in the non-ferroelectric phase.

In a further aspect of the invention, which utilises the frequency dependency of electric property change as a result of a hereinbefore-described phase change, a measurement of two different electric properties is taken using electric signals of different frequency.

Figure 10:
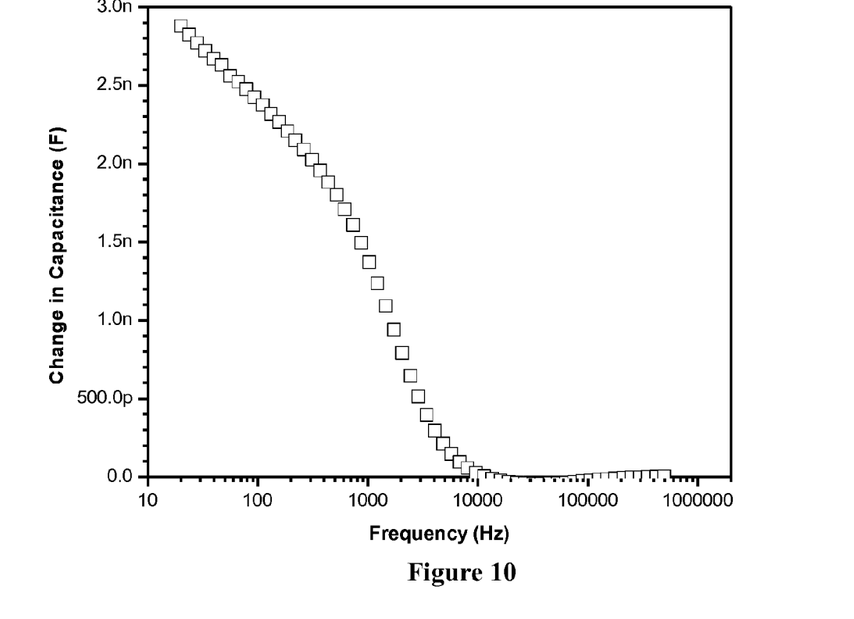
FIG. 10 is a graph showing the change in capacitance of KC FLC 10 as a function of frequency.
Figure 11:
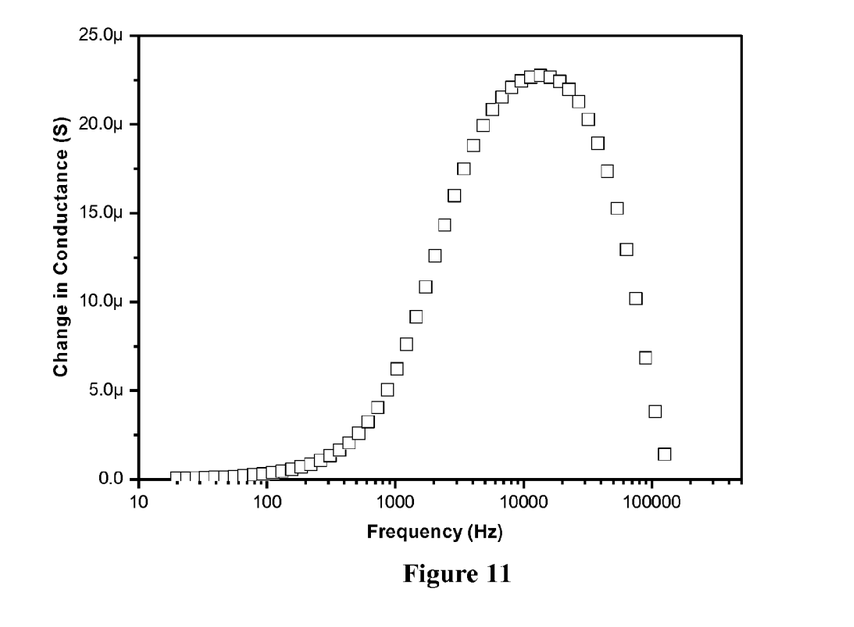
FIG. 11 is a graph showing the change in conductance of KC FLC 10 as a function of frequency.

As seen in FIGS. 10 and 11, it has been found that at a low frequency (e.g. less than 500 Hz) the change in capacitance of the liquid crystal material which results from a hereinbefore-described phase change is significantly greater than that of conductance. At mid-range frequencies (500 Hz-3000 Hz) there is a significant change in both the capacitance and the conductance of the liquid crystal material which results from a phase change. At high frequencies (3000-100000 Hz) the change in conductance of the liquid crystal material which results from a phase change is significantly greater than that of capacitance. At higher frequencies (above 100000 Hz) the change in both the capacitance and the conductance of the liquid crystal material which results from a phase change is significantly diminished. The order of the above frequency regimes will be the same for all appropriate liquid crystalline materials, however, the frequencies at which one regime changes to another will be material dependant. The material concerned in the above case is KC FLC 10.

Since the capacitance and the conductance change due to a relevant phase transition vary as a function of frequency, it may be useful to probe the liquid crystalline material 12 with two electric signals of different frequencies. Alternatively, it may be useful to probe the liquid crystalline material 12 with an electric signal that includes two or more components having different frequencies (e.g. in a single electric signal). Where this is done, the response of the sensor 10 may be analysed in order to determine how the sensor responded to the different frequency components. The liquid crystalline material 12 may for example be probed with a square-wave electric signal, a saw-tooth electric signal, or an electric signal having some other form.

Each frequency may be in a different frequency regime. By way of example, an electric signal with a frequency of 50 Hz is used to measure the capacitance of KC FLC 10 liquid crystalline material and an electric signal of 5000 Hz is used to measure the conductivity. The measurements may be used not only to determine what phase the liquid crystalline material 12 is in, but also, by comparing the measurements, be used to provide a corrected output from the sensor 10. For example, at a given frequency, the capacitance measurement may be affected by minor variations in the sensor geometry, such as variation in the thickness of the liquid crystalline material 12 between the contact plates 14, 16. The examples below show how multiple measurements can be made of at least one electrical property of the liquid crystalline material at more than one frequency so as to obtain a corrected output of the sensor which is independent of the geometry of the sensor.

The first example is as follows. The dielectric permittivity $\varepsilon'$ of the liquid crystalline material 12 is given by $$\varepsilon' = C/C_o \qquad (1)$$

where C is the capacitance of the liquid crystalline material 12 and $C_o$ is the capacitance of the sensor without the liquid crystalline material between the plates.

The imaginary component of the permittivity $\in''$ of the liquid crystalline material, which is related to the energy loss in the liquid crystalline material, is given by $$\in'' = G/\omega C_o \qquad (2)$$

where G is the conductance of the liquid crystalline material and $\omega$ is the frequency at which the measurements are made.

The imaginary component of the permittivity $\in''$ is also given by $$\in'' = \in' \tan\delta \qquad (3)$$

where $\delta$ is a phase difference between the applied electric field and the electric field within the liquid crystalline material.

As such, it follows that $$C = (G\omega) \cdot (1/\tan\delta) \qquad (4)$$

At a frequency $\omega_A$, the capacitance is given by $$C_A = (G_A/\omega_A) \cdot (1/\tan\delta_A) \qquad (5)$$

where $C_A$ is the capacitance of the sensor at frequency $\omega_A$, $G_A$ is the conductance of the liquid crystalline material at frequency $\omega_A$ and $\delta_A$ is a phase difference between the applied electric field and the electric field within the liquid crystalline material at frequency $\omega_A$.

At a frequency $\omega_B$, the capacitance is given by $$C_B = (G_B/\omega_B) \cdot (1/\tan\delta_B) \qquad (6)$$

where $C_B$ is the capacitance of the sensor at frequency $\omega_B$, $G_B$ is the conductance of the liquid crystalline material at frequency $\omega_B$ and $\delta_B$ is a phase difference between the applied electric field and the electric field within the liquid crystalline material at frequency $\omega_B$.

It therefore follows that $$\frac{C_A}{C_B} = \frac{G_A}{G_B} \cdot \frac{\varpi_B}{\varpi_A} \cdot \frac{\tan\delta_B}{\tan\delta_A} \text{ or } \frac{C_A G_B}{C_B G_A} = \frac{\varpi_B}{\varpi_A} \cdot \frac{\tan\delta_B}{\tan\delta_A} \qquad (7)$$

As $\omega_A$ and $\omega_B$ are chosen values, and $\delta_A$ and $\delta_B$ are values which are dependant only upon the material properties of the liquid crystalline material, the ratio between $C_A \cdot G_B$ and $C_B \cdot G_A$ is independent of the geometry of the sensor. As such the ratio between $C_A \cdot G_B$ and $C_B \cdot G_A$ is unaffected by variations in the thickness of the liquid crystalline material.

This type of measurement is particularly advantageous as it is possible to choose $\omega_A$ and $\omega_B$ so that they are in different frequency regimes as discussed above. For example, if $\omega_A$ is chosen such that it is a frequency at which $C_A$ is large and $G_A$ is small; and $\omega_B$ is chosen such that it is a frequency at which $G_B$ is large and $C_B$ is small then the value of $C_A \cdot G_B/C_B \cdot G_A$ will be significantly larger than any of the individual values of $C_A$, $G_B$, $C_B$ or $G_A$. As the corrected sensor output of $C_A \cdot G_B/C_B \cdot G_A$ is significantly larger than $C_A$, $G_B$, $C_B$ or $G_A$ it means that any abrupt change in the corrected sensor output due to a change in state of the liquid crystalline material will be more straightforward to measure.

It may also be possible to provide a corrected sensor output by measuring the same electric property of the liquid crystalline material at different frequencies, examples of which are given below:

If the liquid crystalline material 12 is sandwiched between similar parallel plates then the capacitance C of the plates and liquid crystalline material is given by:

$$C = \in \in_o A/d \qquad (8)$$

where $\in$ is the dielectric permittivity of the liquid crystalline material, $\in_o$ is the permittivity of free space ($8.854 \times 10^{-12}$ F/m), A is the area of the conducting plates 14, 16; and d is the plate separation.

At a certain frequency $f_A$, where the separation is $d_1$, then capacitance $C_1^{fA}$ is defined as:

$$C_1^{fA} = \in^A \in_o A/d_1 \qquad (9)$$

where $\in^A$ is the dielectric permittivity of the liquid crystalline material at the frequency $f_A$.

At another frequency $f_B$, then capacitance is defined as:

$$C_1^{fB} = \in^B \in_o A/d_1 \qquad (10)$$

where $\in^B$ is the dielectric permittivity of the liquid crystalline material at the frequency $f_B$.

If the separation of the plates 14, 16 is changed to $d_2$, at frequency $f_A$ the capacitance is given by:

$$C_2^{fA} = \in^A \in_o A/d_2 \qquad (11)$$

Likewise, at frequency $f_B$ the capacitance is:

$$C_2^{fB} = \in^B \in_o A/d_2 \qquad (12)$$

As such, $$C_1^{fA}/C_1^{fB} = \in^A/\in^B \qquad (13)$$

and $$C_2^{fA}/C_2^{fB} = \in^A/\in^B \qquad (14)$$

Due to the fact that $\in^A$ and $\in^B$ are properties of the liquid crystalline material which are independent of the sensor geometry, the ratio between the capacitance of the liquid crystalline material 12 at two different frequencies is also independent of the sensor geometry (e.g. the separation of the plates 14, 16). As such, this measurement will be unaffected by variations in thickness of the liquid crystalline material 12 and can hence be used as a corrected output.

Another example of using measurements of an electrical property at different frequencies is using conductance:

The conductance G of the liquid crystalline material is given by $$G = \omega C_o \in'' \qquad (15)$$

where $\omega$ is the angular frequency of the electronic measuring signal, $C_o$ is the empty cell capacitance, i.e. the capacitance of the sensor in air in the absence of the liquid crystalline material; and $\in''$ is the imaginary part of permittivity which is related to the energy loss in the liquid crystal material.

At a frequency $\omega_A$ the conductance $G_A$ is defined as $$G_A = \omega_A C_o \in''_A \qquad (16)$$

where $\in''_A$ is the imaginary part of the permittivity of the liquid crystal at frequency $\omega_A$.

Similarly, at another frequency $\omega_B$ the conductance $G_B$ is defined as $$G_B = \omega_B C_o \in''_B \qquad (17)$$

where $\in''_B$ is the imaginary part of the permittivity of the liquid crystal at frequency $\omega_B$.

As such $$G_A/G_B = \omega_A \in''_A / \omega_B \in''_B. \qquad (18)$$

Hence, the ratio between $G_A$ and $G_B$ is a quantity which is dependant only on properties of the liquid crystalline material and the measuring frequencies; and not on the geometry of the electrical contacts 14, 16. As such, the ratio may also be used as a corrected sensor output.

These corrected sensor outputs are possible because, regardless of the frequency used to take the measurements, the phase transition between polar and non-polar states will occur at the same temperature and as such the step change in the measured electrical property (e.g. capacitance or conductance) will also occur at the same temperature.

Although the described embodiments comprise electrical contacts which are parallel plates, any form of electrical contact may be used. The contacts may be any pair of spaced formations which contact the liquid crystalline material. For example, the contacts may be a pair of pins, a pin and a plate or plates of any shape or orientation. Furthermore, although the described embodiment comprises a thickness of liquid crystalline material sandwiched between a pair of plates, it will be appreciated that a planar sensor geometry may be used, i.e. one in which both contacts lie in substantially the same plane. One such arrangement may include interdigitated plate contacts.

The invention claimed is:

1. A method of temperature sensing using a temperature sensor device, said device comprising a plurality of temperature sensor cells, each temperature sensor cell comprising an electrical temperature sensor, said electrical temperature sensor comprising:
    a liquid crystalline material capable of existing in a crystal state, a liquid crystal state or a liquid state;
    first and second electrically conductive contacts, having a spaced relationship there between, which contact the liquid crystalline material;
    and an electric property measuring device, electrically connected to the first and second contacts and arranged to measure an electric property of the liquid crystalline material; wherein the liquid crystalline material has a transition temperature T at which it undergoes a phase change between polar and non-polar states, the phase change between polar and non-polar states occurring within the liquid crystal state and causing a change in said electric property of the liquid crystalline material; and wherein the transition temperature T of the liquid crystalline material in at least two of the temperature sensor cells is different;
the method comprising:
    measuring said electric property of the liquid crystalline material in each temperature sensor cell via the first and second contacts;
    determining whether the transition temperature for each temperature sensor cell has been reached as a function of the measured electric property; and
    detecting the sensed temperature as lying between the transition temperatures of a first temperature sensor cell and a second temperature sensor cell, the transition temperatures of which are adjacent within a temperature range, wherein the measured electric property of the first temperature sensor cell indicates that the transition temperature has been reached and the electrical property of the second temperature sensor cell indicates that the transition temperature has not been reached.

2. An electrical temperature sensor device that is capable of sensing temperature over a desired temperature range R, said device comprising a plurality X of temperature sensor cells, each temperature sensor cell comprising an electrical temperature sensor, said electrical temperature sensor comprising:
    a liquid crystalline material capable of existing in a crystal state, a liquid crystal state or a liquid state;
    first and second electrically conductive contacts, having a spaced relationship there between, which contact the liquid crystalline material;
    and an electric property measuring device, electrically connected to the first and second contacts and arranged to measure an electric property of the liquid crystalline material; wherein the liquid crystalline material has a transition temperature T at which it undergoes a phase change between polar and non-polar states, the phase change between polar and non-polar states occurring within the liquid crystal state and causing a change in said electric property of the liquid crystalline material;
    wherein the transition temperature T of the liquid crystalline material in at least two of the temperature sensor cells is different,
    the transition temperature of the plurality of temperature sensor cells together cover the desired temperature range and the transition temperature T of each temperature sensor cell differs from each other by an equally spaced increment within the range.

3. An electrical temperature sensor device as claimed in claim 2, wherein the polar state is a ferroelectric phase and the non-polar state is a non-ferroelectric phase.

4. An electrical temperature sensor device as claimed in claim 2, wherein the polar state is a ferrielectric phase and the non-polar state is a non-ferrielectric phase.

5. An electrical temperature sensor device as claimed in claim 2, wherein said change in an electric property is a step change.

6. An electrical temperature sensor device as claimed in claim 2, wherein said electric property is one of impedance, inductance, resistance, conductance or capacitance.

7. An electrical temperature sensor device as claimed in claim 2, wherein liquid crystals within the liquid crystalline material are aligned.

8. An electrical temperature sensor device as claimed in claim 2, wherein the first and second contacts are parallel plates, the liquid crystalline material being received therebetween.

9. An electrical temperature sensor device as claimed in claim 3, wherein the ferroelectric phase is the chiral Smectic C phase.

10. An electrical temperature sensor device as claimed in claim 3, wherein the non-ferroelectric phase is one of Smectic A, Nematic, or anti-ferroelectric phases.

11. An electrical temperature sensor device as claimed in claim 2, wherein said change in said electric property of the liquid crystalline material is measured via said first and second contacts by an electrical signal which is supplied across said first and second contacts.

12. An electrical temperature sensor device as claimed in claim 11, wherein said electrical signal comprises at least one pulse.

13. An electrical temperature sensor device as claimed in claim 11, wherein said electrical signal is periodic.

14. An electrical temperature sensor device as claimed in claim 13, wherein said electrical signal oscillates.

15. An electrical temperature sensor device as claimed in claim 14, wherein the oscillation has a frequency of less than 15 kHz.

16. An electrical temperature sensor device as claimed in claim 14 wherein the oscillation has a frequency of less than 1 kHz and said measurable change in an electric property is a change in capacitance.

17. An electrical temperature sensor device as claimed in claim 14, wherein the oscillation has a frequency greater than 1 kHz and said measurable change in an electric property is a change in conductance.

18. An electrical temperature sensor device as claimed in claim 2, wherein T has a value of less than 150° C.

* * * * *